(12) United States Patent
Slama et al.

(10) Patent No.: US 12,345,565 B2
(45) Date of Patent: Jul. 1, 2025

(54) SYSTEM AND NON-CONTACT METHOD FOR MEASURING VIBRATION ON SURFACE OF AN OBJECT

(71) Applicant: ConcurrentData, Inc., Redford, MI (US)

(72) Inventors: Karl Slama, Sunnyvale, CA (US); Mark Rauchfuss, Birmingham, MI (US)

(73) Assignee: ConcurrentData, Inc., Brighton, MI (US)

(*) Notice: Subject to any disclaimer, the term of this patent is extended or adjusted under 35 U.S.C. 154(b) by 382 days.

(21) Appl. No.: 18/087,190

(22) Filed: Dec. 22, 2022

(65) Prior Publication Data

US 2023/0204409 A1    Jun. 29, 2023

Related U.S. Application Data

(60) Provisional application No. 63/361,455, filed on Jul. 25, 2023.

(51) Int. Cl.
*G01H 9/00* (2006.01)

(52) U.S. Cl.
CPC .................... *G01H 9/00* (2013.01)

(58) Field of Classification Search
CPC ....................................................... G01H 9/00
See application file for complete search history.

(56) References Cited

U.S. PATENT DOCUMENTS

| 5,038,616 A * | 8/1991 | Schneider .............. G01H 1/003 |
| | | 73/660 |
| 5,207,766 A | 5/1993 | Conforti et al. |
| 11,583,185 B2 | 2/2023 | Homyk et al. |

(Continued)

FOREIGN PATENT DOCUMENTS

| CN | 103424177 A | 12/2013 |
| CN | 104236464 A | 12/2014 |
| WO | WO-2020216953 A1 | 10/2020 |

OTHER PUBLICATIONS

International Search Report and Written Opinion regarding International Patent Application No. PCT/US2022/054047, dated May 22, 2023.

(Continued)

*Primary Examiner* — Kristina M Deherrera
*Assistant Examiner* — Jean F Morello
(74) *Attorney, Agent, or Firm* — Harness, Dickey & Pierce, P.L.C.

(57) ABSTRACT

A non-contact method is presented for measuring vibration on a surface of an object. The method includes: projecting light from three light sources towards a point of interest on a surface of an object, and detecting the light reflected by the point of interest on the surface using three detectors, where each detector of the three detectors captures light from a corresponding one of the three light sources. From the light captured, calculating vertical displacement of the surface at the point of interest using triangulation, calculating rotational displacement of the surface at the point of interest about an x axis using triangulation; and calculating rotational displacement of the surface at the point of interest about y axis using triangulation, where the x axis and the y axis define a plane which is parallel to surface of the object.

18 Claims, 6 Drawing Sheets

(56) References Cited

U.S. PATENT DOCUMENTS

| | | | |
|---|---|---|---|
| 11,585,653 | B2 | 2/2023 | Konyndyk et al. |
| 11,585,931 | B2 | 2/2023 | Remelius |
| 2006/0209631 | A1 | 9/2006 | Melese et al. |
| 2007/0127038 | A1* | 6/2007 | Chien .................... G01B 11/14 356/623 |
| 2023/0001655 | A1 | 1/2023 | Lofgren |
| 2023/0047415 | A1 | 2/2023 | Adema et al. |
| 2023/0047877 | A1 | 2/2023 | Cui et al. |
| 2023/0048446 | A1 | 2/2023 | Sugawara et al. |
| 2023/0048766 | A1 | 2/2023 | Frey |

OTHER PUBLICATIONS

Florian Dreier, Philipp Günther, Thorsten Pfister, Jürgen W. Czarske, and Andreas Fischer, "Interferometric Sensor System for Blade Vibration Measurements in Turbomachine Applications". IEEE Transactions on Instrumentation and Measurement, vol. 62, No. 8, Aug. 2013.

Dongkyu Kim, Hajun Song, Hossam Khalil, Jongsuh Lee, Semyung Wang, and Kyihwan Park, "3-D Vibration Measurement Using a Single Laser Scanning Vibrometer by Moving to Three Different Locations". IEEE Transactions on Instrumentation and Measurement, vol. 63, No. 8, Aug. 2014.

Bo Ni et al., "Research on Calibration Technology of Displacement and Angle for Triaxial Flight Vibration Test System under the Coupling Vibration Environment". 2021, IEEE 15th International Conference on Electronic Measurement & Instruments (ICEMI), 978-1-6654-4491-0.

Songxu Li et al., "Ultra-micro Vibration Measurement Method Using CW Doppler Radar". 2020, IEEE, 978-1-7281-9277-2.

Tech Briefs: Engineering Solutions for Design & Manufacturing, vol. 47, No. 2, Feb. 2023. <https://www.nxtbook.com/smg/techbriefs/23TB02/ <https://protect-us.mimecast.com/s/VJf0CW6wLpCzD37XhniL40?domain=nxtbook.com>.

Tech Briefs: Sensor Technologies, vol. 47, No. 2, Feb. 2023. <https://www.nxtbook.com/smg/techbriefs/23TB02/_<https://protect-us.mimecast.com/s/VJf0CW6wLpCzD37XhniL40?domain=nxtbook.com>.

Light: Science & Applications (Light Sci Appl). ISSN 2047-7538 (online). Spring Nature Limited, 2023. <https://www.nature.com/lsa/>.

Light: Advanced Manufacturing, Light Publishing Group, 2021. <https://www.light-am.com/>.

* cited by examiner

Vertical Displacement $b/L = dx/dz = \tan(\text{Theta}) = \sin(\text{Theta})/\cos(\text{Theta})$
$dz1/(2*dx) = \cos(\text{Theta})$
$dz = dz1/(2*\sin(\text{Theta}))$ Pitch $dz2/\sqrt{L^2+b^2} = \tan(2*\text{Delta}) = \sin(2*\text{Delta})/\cos(2*\text{Delta})$
$\text{Delta} = \arctan(dz2/\sqrt{L^2+b^2})/2$ Roll $dy = \sqrt{L^2+b^2} * \tan(2*\text{Rho})$
$\text{Rho} = \arctan(dy/\sqrt{L^2+b^2})/2$

SYSTEM AND NON-CONTACT METHOD FOR MEASURING VIBRATION ON SURFACE OF AN OBJECT

CROSS-REFERENCE TO RELATED APPLICATIONS

This application claims the benefit of U.S. Provisional Application No. 63/361,455, filed on Dec. 27, 2021. The entire disclosure of the above application is incorporated herein by reference.

FIELD

The present disclosure relates to a non-contact and minimally invasive method for measuring vibration or oscillations on a surface of an object, for example in a frequency range of zero to 50 kilohertz.

BACKGROUND

Conventional methods of measuring surface oscillations on the surface of an object or structure under test rely upon physically attaching piezoelectric sensors to the surface of the object. There are a number of undesirable effects and dependencies resulting from physical attachment of these sensors onto the surface of the object, which affect the physical and acoustical behavior of the surface, and can result in inaccurate and unreliable observation of surface oscillations. Therefore, it is desirable to develop a non-contact technique for measuring vibrations or oscillations on a surface of an object.

This section provides background information related to the present disclosure which is not necessarily prior art.

SUMMARY

This section provides a general summary of the disclosure, and is not a comprehensive disclosure of its full scope or all of its features.

In one aspect, a non-contact method is presented for measuring vibration on a surface of an object The method includes: projecting, by a light source, light along a projection axis towards a point of interest on a surface of an object; detecting, by a detector, the light reflected by the point of interest on the surface; determining, by a processor, a change in position of the reflected light detected by the detector over time, where the processor is interfaced with the detector; and calculating, by the processor, at least three measurements of vertical displacement of the surface from the change in position using triangulation.

In one embodiment, vertical displacement is calculated according to $$dz = dz1/(2*\sin(\Theta))$$

where dz1 is the change in position of the reflected light on the detector and $\Theta$ is angle between the projection axis and a base plane, wherein a line between the light source and the detector lies in the base plane and the base plane is parallel to the surface of the object.

The detector detects light reflected by the point of interest on the surface at more than 40,000 frames per second, for example at 160,000 frames per second.

In another aspect, a non-contact method for measuring vibration on a surface of an object along three degrees of freedom. The method includes: projecting light from three light sources towards a point of interest on a surface of an object, where the light projected from the three light sources is coherent; and detecting the light reflected by the point of interest on the surface using three detectors, where each detector of the three detectors captures light from a corresponding one of the three light sources. From the light captured by the three detectors, a processor calculates three displacement values associated with the point of interest, where the processor is interfaced with each of the three detectors. Specifically, the processor calculates vertical displacement of the surface at the point of interest using triangulation, calculates rotational displacement of the surface at the point of interest about an x axis using triangulation; and calculates rotational displacement of the surface at the point of interest about y axis using triangulation, where the x axis and the y axis define a plane which is parallel to surface of the object.

In an example embodiment, the three light sources and the three detectors are arranged in a base plane, where the base plane is parallel to the surface of the object. Additionally, the three light source and the three detectors are positioned in relation to the surface of the object, such that each light source and detector pair form an isosceles triangle with the point of interest and the point of interest is a common vertex for each of the isosceles triangles. The three light source and the three detectors may be integrated into a single observation device.

In one embodiment, a first light source and detector pair and a second light source and detector pair are arranged on the x axis while a third light source and detector pair is arranged on the y axis, such that the first light source is adjacent to the second detector and the second light source is adjacent to the first detector.

In this embodiment, vertical displacement (dz) is calculated according to $$dz = dz1/(2*\sin(\Theta))$$

where dz1 is the change in position of the reflected light attributed to change in vertical displacement of the surface and $\Theta$ is angle between a projection axis of the light towards the object and a base plane, wherein a line between the light source and the detector lies in the base plane and the base plane is parallel to the surface of the object.

Rotational displacement ($\Delta$) about the x axis is calculated according to $$\Delta = \arctan(dz/\mathrm{sqrt}(L^2+b^2))/2$$

where dz is the change in position of the reflected light attributed to change in rotational displacement about the x axis, b is length of base of a triangle formed by a light source, its corresponding detector and the point of interest, and L is length of an altitude to the base of the triangle.

Rotational rotational displacement ($\rho$) about the y axis is calculated according to $$\rho = \arctan(dy/\mathrm{sqrt}(L^2+b^2))/2$$

where dy is the change in position of reflected light attributed to change in rotational displacement about the y axis, b is length of base of a triangle formed by a light source, its corresponding detector and the point of interest, and L is length of an altitude to the base of the triangle.

In another embodiment, a first light source and detector pair is arranged on the x axis, a second light source and detector pair is arranged directly above the point of interest, and a third light source and detector pair is arranged on the y axis.

Furthermore, the three displacement values may be computed over time, such that at least one of a direction or frequency of a wave propagating along the surface at the point of interest can be determined.

In yet another aspect, a system is presented for measuring vibration on a surface of an object. The system includes: a first light source configured to project light along a first projection axis towards a point of interest on a surface of an object; a first light detector configured to detect light primarily from the first light source, where the light is reflected by the point of interest on the surface; a second light source configured to project light along a second projection axis towards the point of interest on the surface of the object; a second light detector configured to detect light primarily from the second light source, where the light is reflected by the point of interest on the surface; a third light source configured to project light along a projection axis towards the point of interest on the surface of the object; and a third light detector configured to detect light primarily from the third light source, where the light is reflected by the point of interest on the surface. A processor is in data communication with the first light detector, the second light detector and the third light detector. The processor determines a change in position of the reflected light detected by at least one of the first light detector, the second light detector or the third light detector, and calculates a vertical displacement of the surface at the point of interest from the change in position using triangulation.

The processor further calculates rotational displacement of the surface at the point of interest about an x axis using triangulation; and calculates rotational displacement of the surface at the point of interest about y axis using triangulation, where the x axis and the y axis define a plane which is parallel to surface of the object.

In an example embodiment, the three light sources and the three detectors are arranged in a base plane, where the base plane is parallel to the surface of the object. Additionally, the three light source and the three detectors are positioned in relation to the surface of the object, such that each light source and detector pair form an isosceles triangle with the point of interest and the point of interest is a common vertex for each of the isosceles triangles. The three light source and the three detectors may be integrated into a single observation device.

In one embodiment, a first light source and detector pair and a second light source and detector pair are arranged on the x axis while a third light source and detector pair is arranged on the y axis, such that the first light source is adjacent to the second detector and the second light source is adjacent to the first detector.

In another embodiment, a first light source and detector pair is arranged on the x axis, a second light source and detector pair is arranged directly above the point of interest, and a third light source and detector pair is arranged on the y axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
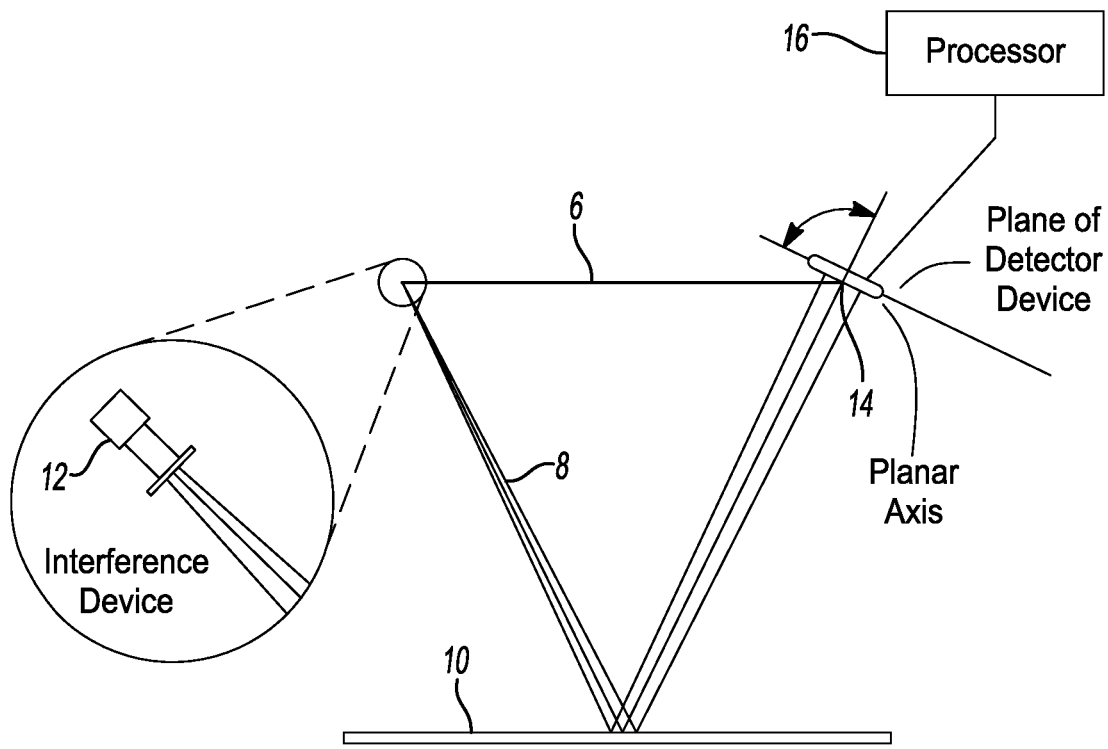
FIG. 1 is a diagram illustrating a non-contact technique for measuring vibrations on a surface of an object.

FIG. 1 illustrates a non-contact technique for measuring vibrations (or oscillations) on a surface 10 of an object. Light is projected by a light source 12 along a projection axis 8 towards a point of interest on a surface of the object. Light reflected by the surface is in turn detected by a light detector 14. In one example, the light source is further defined as a laser and the light detector is further defined as a charge-coupled device (CCD). It is readily understood that other types of light detectors also fall with the scope of this disclosure.

To calculate vertical displacement of the surface at the point of interest, the light detector 14 is interfaced with a processor 16. The processor 16 determines a change in position of the reflected light detected by the detector. From the change in position, the vertical displacement of the surface can be calculated using triangulation. More specifically, vertical displacement is calculated according to $$dz = dz1/(2*\sin(\Theta))$$

where $dz1$ is the change in position of the reflected light on the detector and $\Theta$ is angle between the projection axis 8 and a base plane 6, wherein a line between the light source and the detector lies in the base plane and the base plane is parallel to the surface of the object. In order to report oscillations of the surface, the light detector 14 is configured to capture changes in light position at more than 40,000 frames per second. In an example embodiment, the light detector is clocked at 160,000 frames per second. Additionally, at least three measurements are needed to define a waveform indicative of the oscillations. This non-contact approach does not affect the physical and acoustical behavior of the surface of the object. Furthermore, this approach is unsusceptible to high temperatures, high temperature gradient, and exposure to extreme electrostatic and electromagnetic interference.

In one example, the processor 16 is implemented as a microcontroller. It should be understood that the functions performed by the processor can be implemented in hardware logic, software logic, or a combination of hardware and software logic. In this regard, processor 16 can be or can include any of a digital signal processor (DSP), microprocessor, microcontroller, or other programmable device which are programmed with software implementing the above described methods. It should be understood that alternatively the processor is or includes other logic devices, such as a Field Programmable Gate Array (FPGA), a complex programmable logic device (CPLD), or application specific integrated circuit (ASIC). When it is stated that processor 16 performs a function or is configured to perform a function, it should be understood that processor 16 is configured to do so with appropriate logic (such as in software, logic devices, or a combination thereof).

Figure 2:
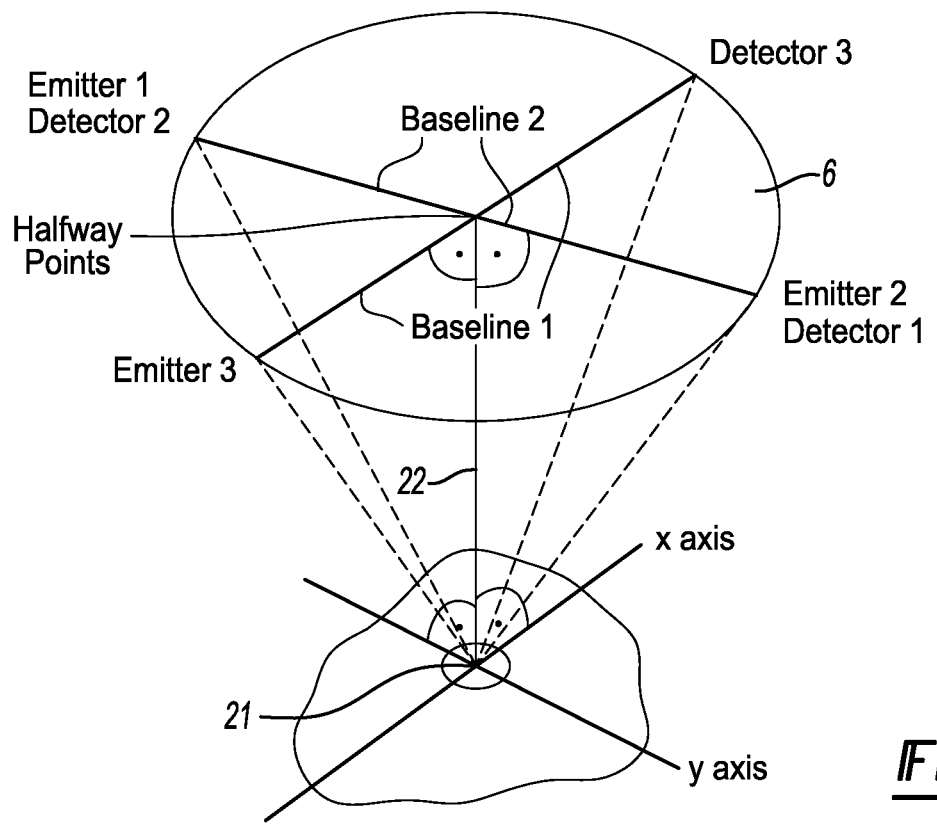
FIG. 2 is a diagram illustrating the non-contact technique for measuring vibrations on a surface of an object with the use of three emitter/detector pairs.

To observe dynamic change in topography of the surface in three degrees of freedom, the non-contact measurement technique preferably includes three emitter/detector pairs as seen in FIG. 2. Light is projected from the three light sources towards the point of interest 21 on the surface of the object. The projected light is preferably coherent. Light reflected by the surface is detected using three different light detectors. Each light detector captures light from a corresponding one of the three light sources. More specifically, the position of the reflected light incident on the detector is captured by the light detector, such that changes in position of the reflected light incident on the detector over time can be measured. Measurements by each light detector may be triggered concurrently, for example by a reference clock signal. For synchronization, each measurement is tagged or annotated by the processor with a precise timestamp.

In an example embodiment, light projected from the three light sources is coherent. In some implementations, it is envisioned that the three light sources operate at three different wavelengths. Note that the three light sources and three detectors are arranged in a plane that is above the surface of the object. This plane is parallel to the surface of the object and referred to herein as the base plane 6. An imaginary line from the point of interest drawn to and perpendicular with the base plane is referred to as the primary viewing axis 22 (i.e., z axis) and serves as z axis of a Cartesian coordinate system. The remainder of the Cartesian coordinate system (i.e., xy plane) is defined by the plane in which the surface of the object resides.

Figure 3A:
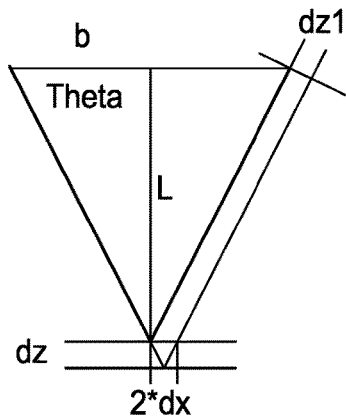
FIG. 3A is a diagram showing the geometric relationship for determining vertical displacement of the surface.
Figure 3B:
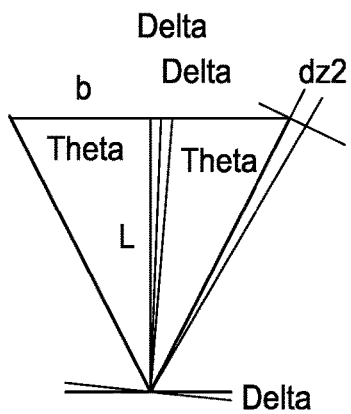
FIG. 3B is a diagram showing the geometric relationship for determining rotational displacement of the surface about the x axis, where the surface resides in the xy plane.
Figure 3C:
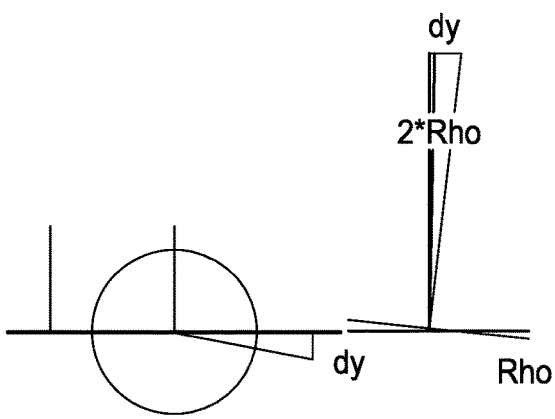
FIG. 3C is a diagram showing the geometric relationship for determining rotational displacement of the surface about the y axis, where the surface resides in the xy plane.

From the light captured by the three light detectors, one can calculate the vertical displacement of the surface, the rotational displacement of the surface about the x axis and the rotational displacement of the surface about the y axis. FIGS. 3A-3C illustrate the geometric relationships for each of these displacements. Vertical displacement, dz, is calculated in accordance with FIG. 3A. Rotational displacement, A, of the surface about the x axis is calculated in accordance with FIG. 3B and rotational displacement, ρ, of the surface about the y axis is calculated in accordance with FIG. 3C.

Figure 4:
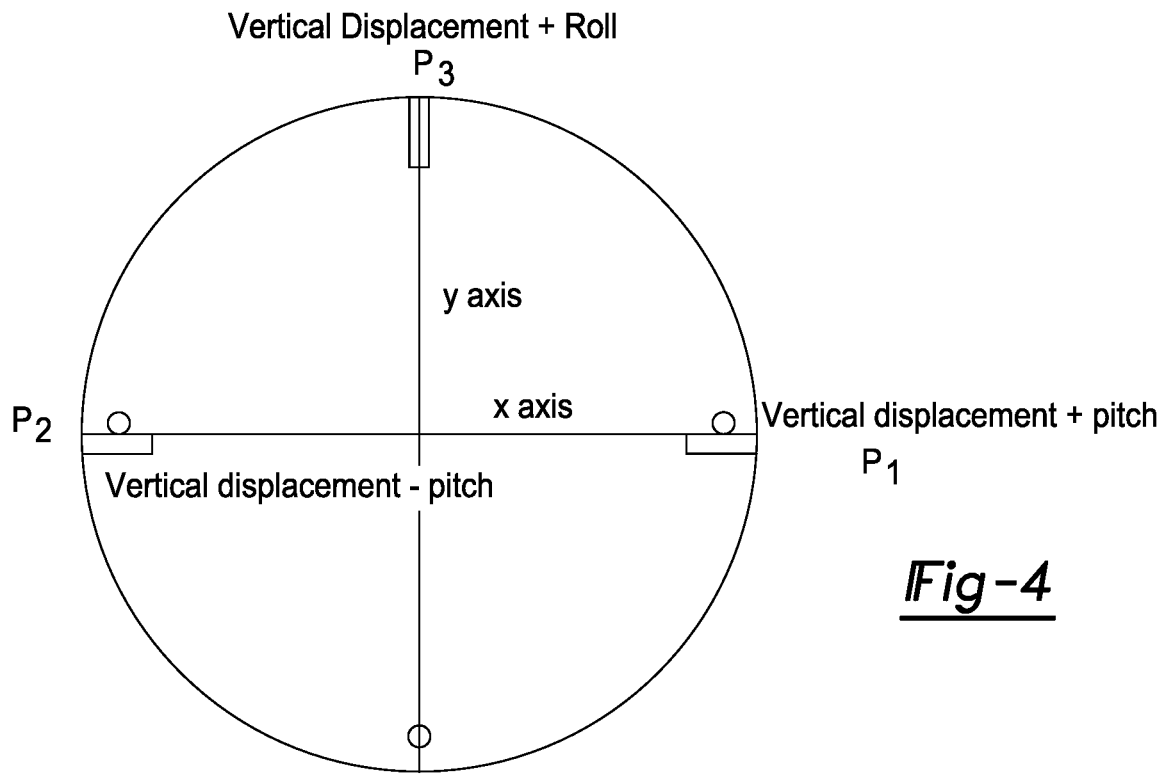
FIG. 4 is a top view showing one example arrangement of the three emitter/detector pairs of the system.

In one example embodiment, the three emitter/detector pairs are arranged in relation to each other as seen in FIG. 4. A first emitter/detector pair P1 is arranged opposing a second emitter detector pair P2, such that both pairs are on the x axis, and a third emitter/detector pair P3 is arranged transverse to the other two pairs on the y axis.

In this arrangement, measurement signals from each emitter/detector pair contains two components of the desired displacements which need to be separated using a linear system of equations. Specifically, the first emitter/detector pair P1 detects dz1+dz2; the second emitter/detector pair P2 detects dz1−dz2; and the third emitter/detector pair P3 detects dz1+dz3. A set of equations is then used to extract the individual components as follows:

$$dz1=(p1+p2)/2$$

$$dz2=(p1-p2)/2$$

$$dz3=p3-dz1$$

Lastly, the displacement values are calculated from these components using the geometric relationships shown in FIGS. 3A-3C. A given set of displacement values are tagged with the timestamp associated with the measurements used to determine the given set of displacement values.

Figure 5:
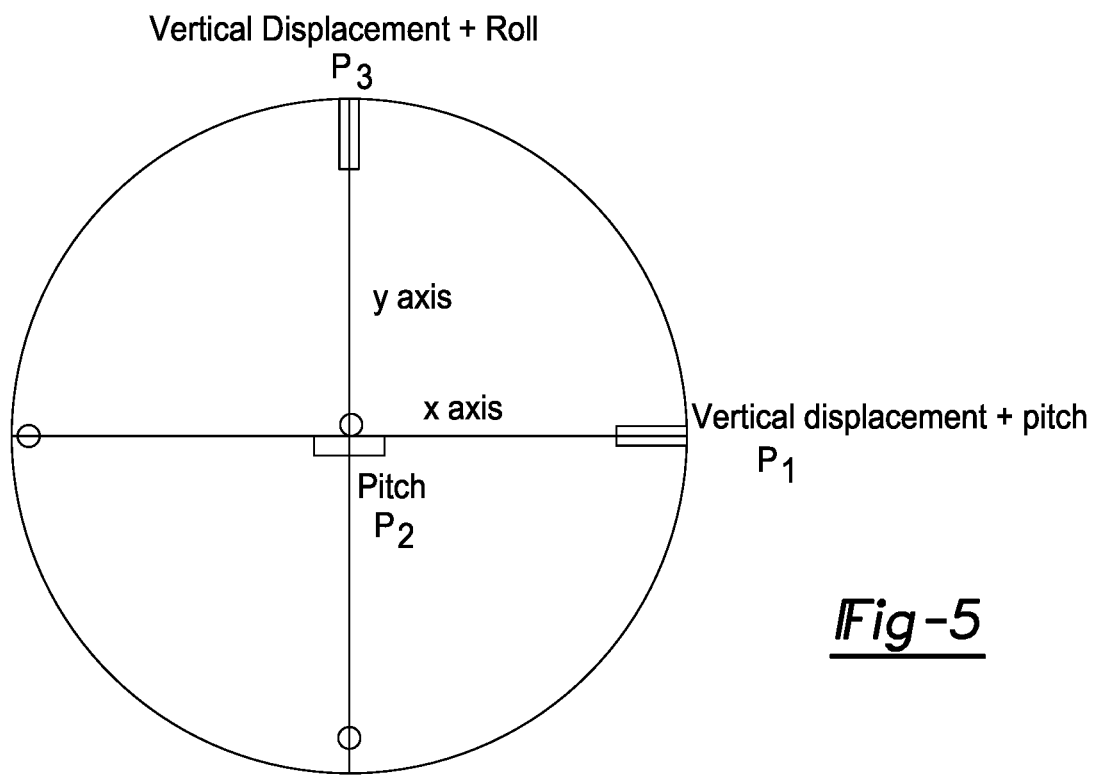
FIG. 5 is a top view showing another example arrangement of the three emitter/detector pairs of the system.

In another example, the three emitter/detector pairs are arranged in relation to each other as seen in FIG. 5. That is, a first emitter/detector pair P1 is arranged on the x axis, a second emitter detector pair P2 is arranged directly above the point of interest on the z axis, and a third emitter/detector pair P3 is arranged on the y axis.

In this arrangement, measurement signals from the emitter/detector pairs also contain components of the desired displacements which need to be separated using a linear system of equations. Specifically, the first emitter/detector pair P1 detects dz1+dz2; the second emitter/detector pair P2 detects dz2; and the third emitter/detector pair P3 detects dz1+dz3. A set of equations is then used to extract the individual components as follows:

$$dz1=p1-p2$$

$$dz2=p2$$

$$dz3=p3-dz1$$

Again, the three displacement values are calculated from these components using the geometric relationships shown in FIGS. 3A-3C. In this way, displacement of the surface at the point of interest is measured in three degrees of freedom and displacement values exhibiting amplitudes in the range of 10 micrometers to 100 millimeters (or more) can be measured.

Figure 6:
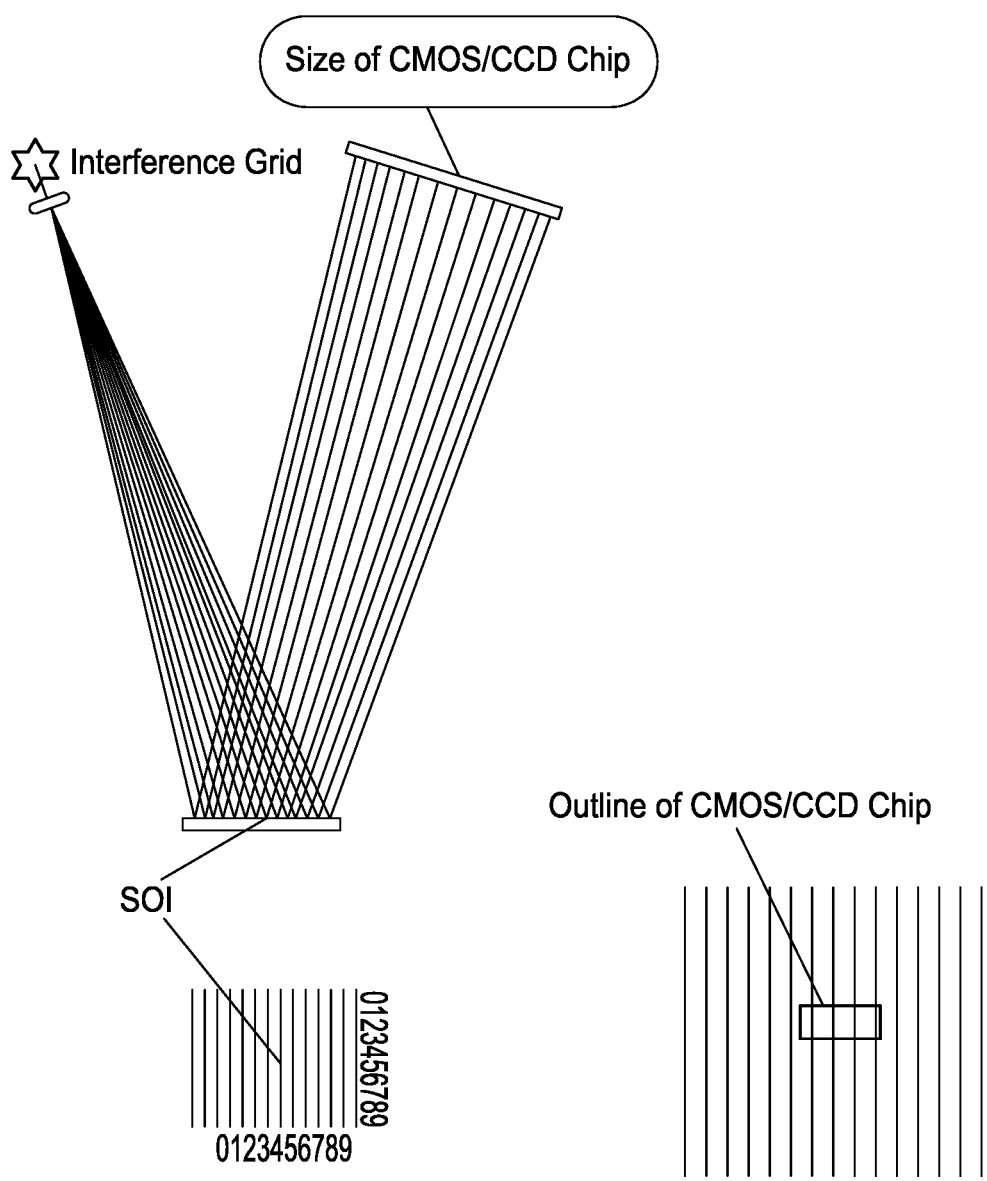
FIG. 6 is a diagram showing the use of an interference device to divide the light projected from a light source.

In some embodiments, an interference device, such as a grid, is used to divide the light from a given light source into a plurality of light beams as seen in FIG. 6, where the light beams are periodically spaced apart from each other.

Displacement of the surface at a given point of interest is indicative of vibrations experienced by the surface of the object. By measuring and computing the three displacement values described above over time, one can generate a times series of displacement values and determine a vector representing a wave propagating along the surface of the object at the point of interest. The vector representing the propagating wave indicates the direction, amplitude and frequency of the wave at the point of interest. In one example, the direction of the propagating wave is calculated as follows Directional angle=arctan(sin(rotation displacement about the x axis)/sin(rotational displacement about the y axis)

Although the directional angle can be computed for each set of displacement values in the time series, it is more accurately determined by computing the directional angle at multiple instances over a period of time and then averaging the values. For example, a moving average may be used to calculate the directional angle, where the window size is preferably larger than the length of the propagating wave. The amplitude of the propagating wave is computed as the difference between the largest and smallest vertical displacement values; whereas, frequency is derived from the time difference between peaks of the propagating wave. In this way, a vector representing a wave propagating along the surface of the object at the point of interest can be constructed. From the displacement values, it is readily understood that other computational techniques may be used to determine a vector representing the wave propagating along the surface of the object at the point of interest.

Figure 7:
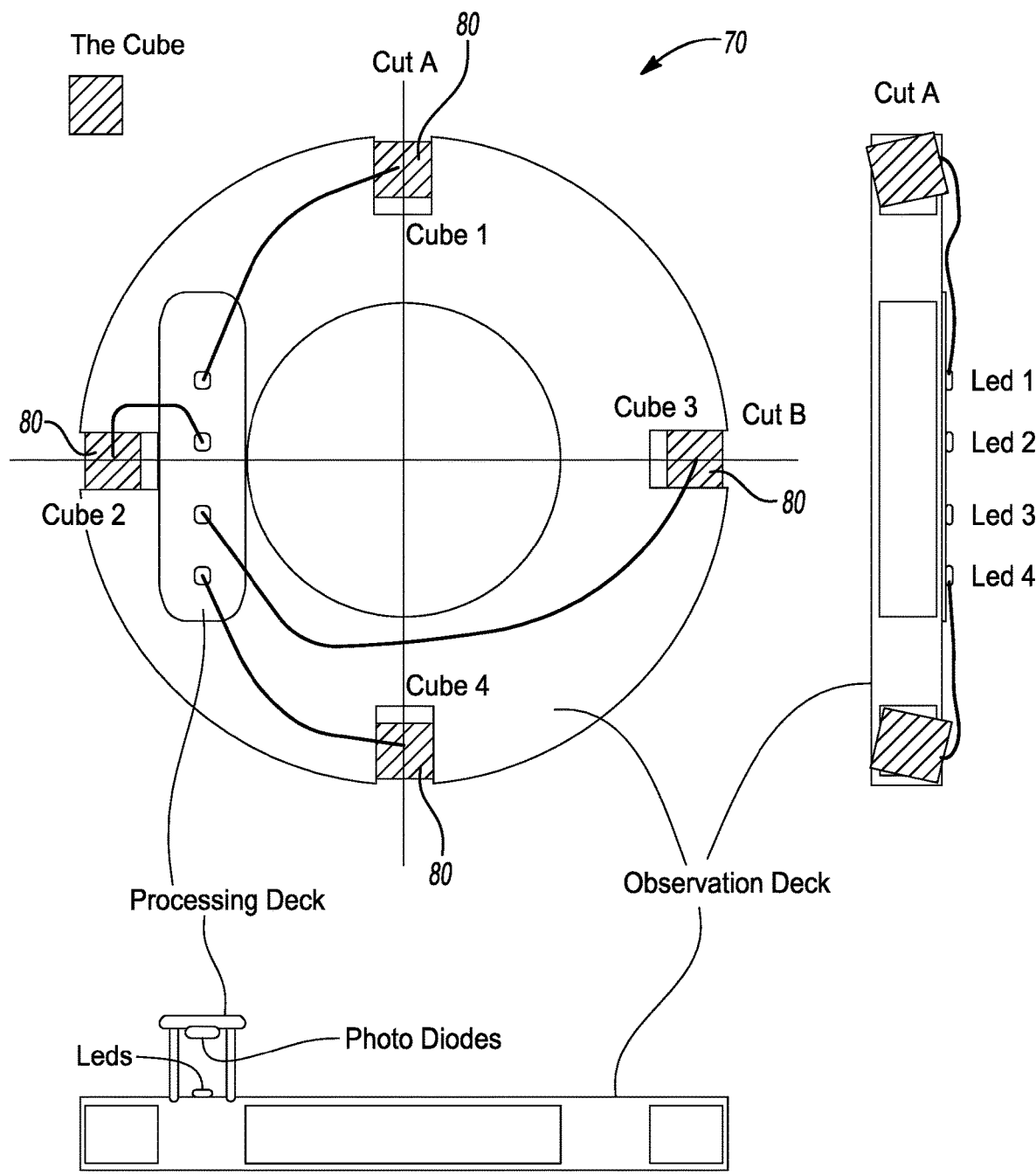
FIG. 7 depicts an example implementation for an observation device.
Figure 8:
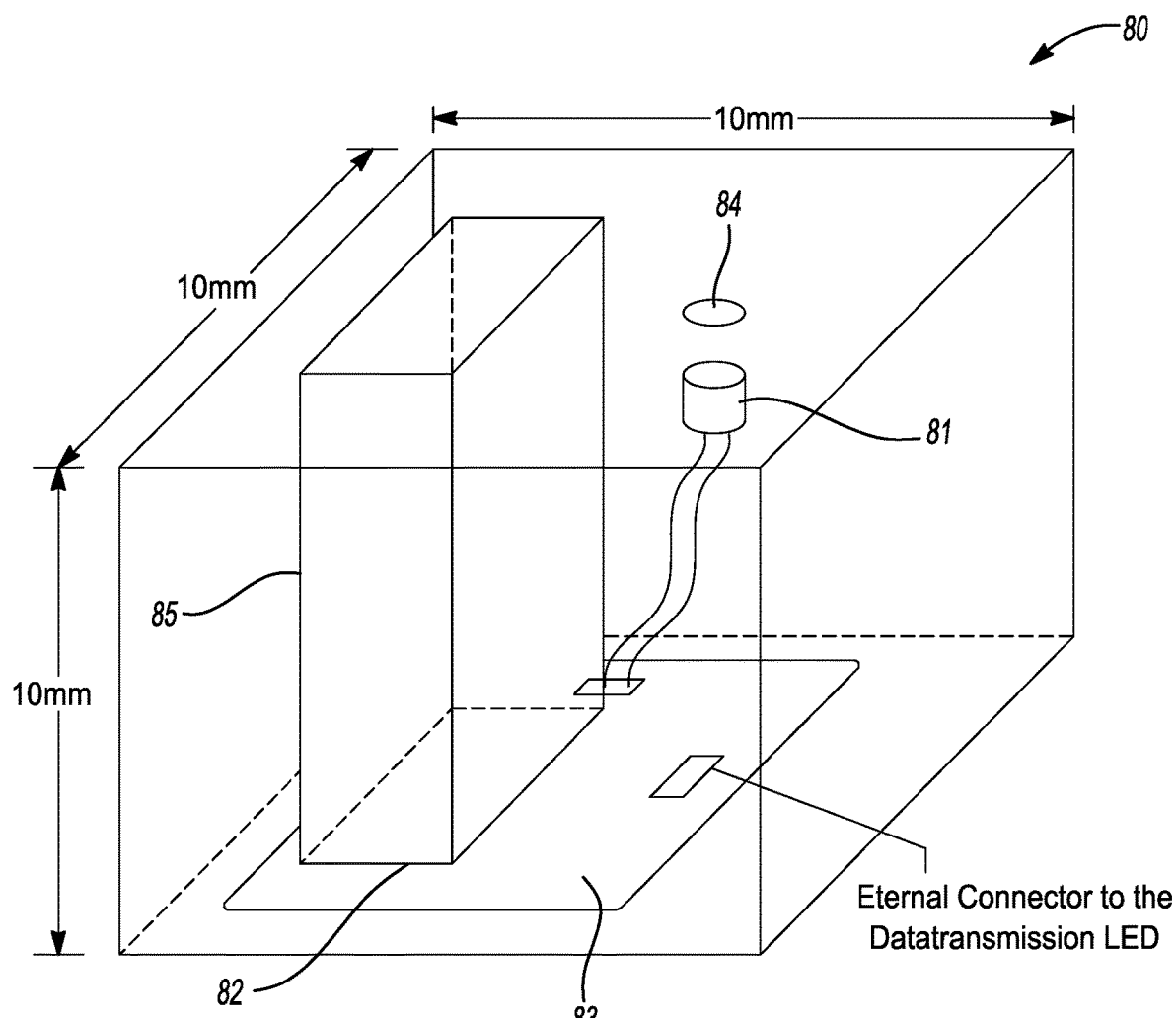
FIG. 8 depicts an example cube element that can be embedded into the observation device.

In one aspect of this disclosure, a system may be constructed for measuring vibrations on a surface of an object, where the system is comprised of one or more observation devices. FIG. 7 depicts an example implementation for an observation device 70. In this example, the observation device 70 has a disk shape with four cube elements 80 embedded along the outer circumference of the disk. A cube element 80 is configured to house a laser diode 81, a linear CCD (e.g., 1024×1 pixel) 82 and supporting electronics on a printed circuit board 83 as seen in FIG. 8. An interference device 84 may be disposed in the projection path of the laser diode 81. Additionally, a shroud 85 may be placed above the linear CCD 82. The shroud surrounds the linear CCD and is designed to block stray and undesired light from reaching the detector, thereby improving the signal to noise ratio of the measurements.

With continued reference to FIGS. 4 and 7, cube 1 houses the CDD for the third emitter/detector P3, cube 2 houses the laser diode for the first emitter/detector pair P1 and the CCD for the second emitter/detector pair P2, cube 3 houses the CCD for the first emitter/detector pair P1 and the laser diode for the second emitter/detector pair P2, and cube 4 houses the laser diode for the third emitter/detector pair P3. One or more QR codes may be placed on an exterior surface of observation device. For example, one QR code may be place on a given observation device to uniquely identify the given observation device in an array of observation devices or, alternatively, four QR codes may be placed on a given observation device, such that each QR code is placed adjacent to one of the cubes. In this way, each cube of the given observation device is uniquely identified.

The observation device 70 is supported above the point of interest on the surface of an object by a support mechanism. As noted above, the light sources and the light detectors are housed by the observation device are arranged in a geometric plane that is substantially parallel to the surface of the object. The geometric plane serves as the xy plane of a Cartesian coordinate system; whereas, an imaginary line drawn from the point of interest to the geometric plane serves as the z axis of the Cartesian coordinate system. For calibration purposes, the support mechanism is configured to adjust the position of the observation device in relation to the surface of the object along five degrees of freedom. That is, position of the observation device can be rotated around the x axis, rotated around the y axis or translated along any of the three axis of the Cartesian coordinate system. It is envisioned that the position of the observation device can be adjusted manually by an operator or in an automated manner, for example using servo motors. Suitable support mechanisms are readily found in the art. A graphical interface may be used to assist with positioning of the observation device. The graphical interface operates to display current observed position and orientation of the observation device relative to the point of interest on the surface as well as a priori CAD models of the surface. Observing the graphical interface, an operator can adjust the observation device accordingly.

An example calibration and set-up procedure for an observation device is further described. First, establish the correct vertical (z) and planar (X-Y) orientation of a given observation device in order to aim the focal point of the observation device onto the point of interest on the surface under investigation. To do so, adjust the support mechanism to achieve X and Y orientation of the base plane of the observation device in order that it would be parallel to the X-Y plane (or perpendicular as derived from average of the slopes in the case of observing an acutely peaked at it's zenith) of the surface at the point of interest, for example by manipulating the supporting fixture orientation-adjustment mechanisms. After completing this step, adjust the distance along the vertical z axis between the base plane of the observation device and that of the surface at the point of interest, for example by means of a rack-and-pinion gear-set. Drawing upon the surface topography provided by 3-D renderings, such as CAD, photogrammetric files or high-resolution photographic images, the operator can make judgements for the selection of the desired point of interest on the surface.

To observe and quantify the effect of undesired external (uncontrolled) sources of mechanical excitation acting upon the surface under investigation, one can initiate projection of light from the light sources at a defined level of intensity onto the surface under investigation at the desired point of interest, in order to accurately quantify what, if any acoustic excitation is being conveyed onto the surface by uncontrolled external forces. In the course of this static characterization procedure, the frequency content, amplitude, and velocity of such external excitation is quantified.

To quantify the effect of undesired external (uncontrolled) sources of illumination that may interfere with correct observation by the light detectors, one can initiate projection of light from the light sources at a defined level of intensity onto the surface under investigation. To determine the effects of any stray light at the desired point of interest, compare the detected level of illumination received by each of the light detectors in the observation device by subtracting the level of projected illumination from each of the light sources.

In some embodiment, the system for measuring vibration on a surface of an object is comprised of a plurality of observation devices arranged spatially apart from each other and above the surface of the object. Each observation device is configured to interrogate a different point of interest on the surface of the object.

To coordinate reporting from the plurality of observation devices, each observation device is in data communication (or interfaced) with a central computing device. More specifically, each observation device is configured to receive the same reference clock signal from the central computing device. The reference clock signal serves as a trigger for the light detectors residing in a given observation device to acquire light measurements. Each observation device also includes at least one QR code or another type of unique identifier which can be used to uniquely identify the given observation device in the plurality of observation devices.

Additionally, the position of each observation device in a common coordinate system is also known by the central computing device. For instance, the position of an observation device may be known a prior from CAD data and/or other design documents. Alternatively, the position of each observation device in the common coordinate system may be determined using an independent camera system. Other techniques for determining the position of the observation devices in relation to each other and/or to a common coordinate system are known in the art.

Data from two or more of the observation devices can in turn be used to quantify other metrics related to vibrations experienced by the surface of the object. For example, the speed of a wave propagating between and observed by two observation devices can be computed. Knowing the distance between two observation devices, speed of a propagating wave is determined by dividing this distance by the time it takes the wave to propagate between the two observation devices. This simplified example assumes the wave is propagating along a straight line connecting the two observation devices.

Figure 9:
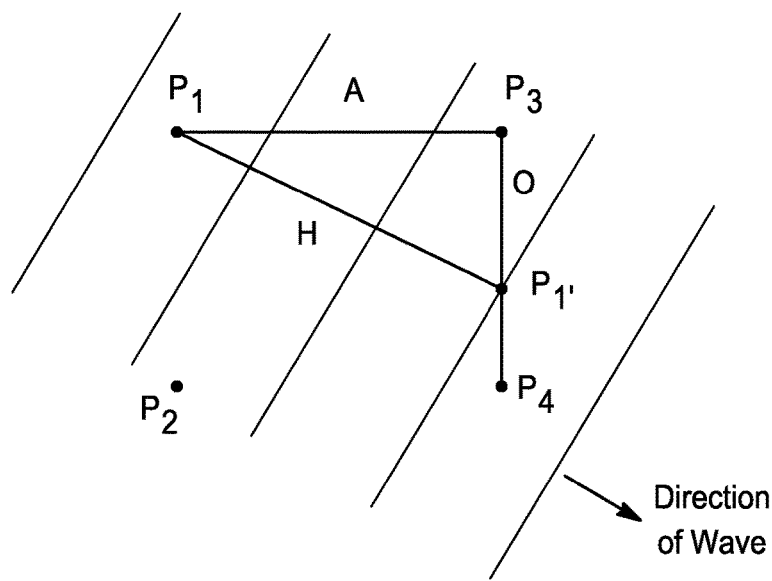
FIG. 9 depicts a wave propagating along a surface in relation to an array of observation devices.

More practically, a wave propagates along a line that passes through one of the observation device P1 but in between two other observation device P3, P4 as seen in FIG. 9. In this case, the wave is traveling in the x-direction. Measure the angle from the x-axis in a counterclockwise sense; this angle can be determined using the direction of wave as computed by observation device P1. The line from P1 to P3 forms the adjacent leg (A) of a right triangle; whereas, the line from P3 that is perpendicular to the adjacent leg, A, to the place where it intersects the x-axis forms the opposite leg (O) of the right triangle; the segment of the x-axis from P1 to the point of intersection forms the hypotenuse (H). There are two different time periods that must be measured. The first of these is the time period between signal peaks at one of the pods. Label this time period as T(freq). It should be the same at both P1 and P3, and it is the inverse of the frequency, f: f=1/T(freq). The second time is the travel time of the wave between P1 and P3. In other words, it is the time between when the peak is observed at P1 and the time that it is observed at P3. Label this time as T(trav). The distance, D, that the wave travels during T(trav) is the distance along the x-axis, i.e., the length of H. The distance along A (from P1 to P3) is known. The angle, theta, has been determined from the directional measurements. The ratio of A to H is the cosine of theta. Therefore the distance, D, along H is A divided by the cosine of theta: H=A/cos(theta). The distance, D, divided by the time period, T(trav), gives the speed of the wave, V: V=D/T(trav). The speed, V, multiplied by the time period associated with the frequency, T(freq), gives the wavelength, lambda: V*T(freq)=lambda.

As noted above, a display device may be interface with the processor. During an investigation, a priori CAD or photographical representation of the surface can be displayed on to the display. Metrics related to vibrations experienced by the surface of the object and observed by the system can also be displayed on the display device. In some embodiments, vibrations, including the different propagating waves, experienced by the surface are animated or otherwise visualized (e.g., using a waterfall illustration) on a graphical user interface.

The computational and measurement techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A non-contact method for measuring vibration on a surface of an object, comprising:

projecting light from three light sources towards a point of interest on a surface of an object, where the light projected from the three light sources is coherent;

detecting the light reflected by the point of interest on the surface using three detectors, where each detector of the three detectors captures light from a corresponding one of the three light sources;

from the light captured by the three detectors, calculating, by a processor, vertical displacement of the surface at the point of interest using triangulation, where the processor is interfaced with each of the three detectors;

from the light captured by the three detectors, calculating, by the processor, rotational displacement of the surface at the point of interest about an x axis using triangulation; and from the light captured by the three detectors, calculating, by the processor, rotational displacement of the surface at the point of interest about y axis using triangulation, where the x axis and the y axis define a plane which is parallel to surface of the object.

2. The non-contact method of claim 1 further comprising arranging the three light sources and the three detectors in a base plane, where the base plane is parallel to the surface of the object.

3. The non-contact method of claim 2 further comprising arranging a first light source and detector pair and a second light source and detector pair on the x axis and arranging a third light source and detector pair on the y axis, such that the first light source is adjacent to the second detector and the second light source is adjacent to the first detector.

4. The non-contact method of claim 3 further comprises calculating vertical displacement (dz) according to $$dz = dz1/(2*\sin(\theta))$$

where dz1 is the change in position of the reflected light attributed to change in vertical displacement of the surface and θ is angle between a projection axis of the light towards the object and a base plane, wherein a line between the light source and the detector lies in the base plane and the base plane is parallel to the surface of the object.

5. The non-contact method of claim 3 further comprises calculating rotational displacement (Δ) about the x axis according to $$\Delta = \arctan(dz/\sqrt{L^2+b^2})/2$$

where dz is the change in position of the reflected light attributed to change in rotational displacement about the x axis, b is length of base of a triangle formed by a light source, its corresponding detector and the point of interest, and L is length of an altitude to the base of the triangle.

6. The non-contact method of claim 3 further comprises calculating rotational displacement (ρ) about the y axis according to $$\rho = \arctan(dy/\sqrt{L^2+b^2})/2$$

where dy is the change in position of reflected light attributed to change in rotational displacement about the y axis, b is length of base of a triangle formed by a light source, its corresponding detector and the point of interest, and L is length of an altitude to the base of the triangle.

7. The non-contact method of claim 2 further comprising arranging a first light source and detector pair on the x axis, arranging a second light source and detector pair directly above the point of interest, and arranging a third light source and detector pair on the y axis.

8. The non-contact method of claim 1 further comprises positioning the three light source and the three detectors in relation to the surface of the object, such that each light source and detector pair form an isosceles triangle with the point of interest and the point of interest is a common vertex for each of the isosceles triangles.

9. The non-contact method of claim 1 further comprises integrating the three light source and the three detectors into an observation device.

10. The non-contact method of claim 1 further comprises dividing light from each of the three light sources into a plurality of light beams, where the light beams are periodically spaced apart from each other.

11. The non-contact method of claim 1 wherein the light source is further defined as a laser and the detector is further defined as a charge-coupled device.

12. The non-contact method of claim 1 further comprises calculating vertical displacement of the surface at the point of interest over time; calculating rotational displacement of the surface at the point of interest about the x axis over time; calculating rotational displacement of the surface at the point of interest about the y axis over time; and determining at least one of a direction or frequency of a wave propagating along the surface at the point of interest using the vertical displacement of the surface over time, the rotational displacement of the surface about the x axis over time, and the rotational displacement of the surface about the y axis over time.

13. A system for measuring vibration on a surface of an object, comprising:

a first light source configured to project light along a first projection axis towards a point of interest on a surface of an object;

a first light detector configured to detect light primarily from the first light source, where the light is reflected by the point of interest on the surface;

a second light source configured to project light along a second projection axis towards the point of interest on the surface of the object;

a second light detector configured to detect light primarily from the second light source, where the light is reflected by the point of interest on the surface;

a third light source configured to project light along a projection axis towards the point of interest on the surface of the object;

a third light detector configured to detect light primarily from the third light source, where the light is reflected by the point of interest on the surface; and a processor in data communication with the first light detector, the second light detector and the third light detector, wherein the processor determines a change in position of the reflected light detected by at least one of the first light detector, the second light detector or the third light detector, and calculates a vertical displacement of the surface at the point of interest from the change in position using triangulation;

wherein the processor further calculates rotational displacement of the surface at the point of interest about an x axis using triangulation; calculates rotational displacement of the surface at the point of interest about y axis using triangulation, where the x axis and the y axis define a plane which is parallel to surface of the object.

14. The system of claim 13 wherein the first light source, the first light detector, the second light source, the second light detector, the third light source, and the third light detector are arranged in a base plane, where the base plane is parallel to the surface of the object.

15. The system of claim 14, wherein the first light source, the first light detector, the second light source, the second light detector, the third light source, and the third light detector are positioned in relation to the surface of the object, such that each light source and detector pair form an isosceles triangle with the point of interest and the point of interest is a common vertex for each of the isosceles triangles.

16. The system of claim 14 wherein the three light source and the three detectors are integrated into an observation device.

17. The system of claim 14 wherein the first light source, the first light detector, the second light source and the second light detector are arranged on the x axis and the third light source and the third light detector are arranged on the y axis, such that the first light source is adjacent to the second light detector and the second light source is adjacent to the first light detector.

18. The system of claim 14 wherein the first light source and the first light detector are arranged on the x axis, the second light source and the second detector are arranged directly above the point of interest, and the third light source and the third light detector are arranged on the y axis.

* * * * *